(12) United States Patent
Masaki

(10) Patent No.: US 6,994,925 B2
(45) Date of Patent: Feb. 7, 2006

(54) MAGNETIC RECORDING MEDIUM

(75) Inventor: Kouichi Masaki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/968,951

(22) Filed: Oct. 21, 2004

(65) Prior Publication Data

US 2005/0089722 A1   Apr. 28, 2005

(30) Foreign Application Priority Data

Oct. 22, 2003   (JP)   ............ P.2003-361636

(51) Int. Cl.
    *G11B 5/706*   (2006.01)
(52) U.S. Cl. ................................. 428/842.8
(58) Field of Classification Search .............. 428/842.8
    See application file for complete search history.

(56) References Cited

U.S. PATENT DOCUMENTS

| | | | |
|---|---|---|---|
| 6,620,499 B2 * | 9/2003 | Masaki | 428/329 |
| 6,727,009 B2 * | 4/2004 | Masaki et al. | 428/842.8 |
| 6,735,057 B2 * | 5/2004 | Ejiri | 360/313 |
| 6,770,359 B2 * | 8/2004 | Masaki | 428/842.8 |
| 6,777,073 B2 * | 8/2004 | Nakamikawa et al. | 428/842 |
| 2004/0001974 A1 | 1/2004 | Sharrock | |

OTHER PUBLICATIONS

T. Tanaka, et al., "Delta-M Measurement and Magnetization Thermal Stability for BA Ferrite Media", Nihon Oyo Jiki Gakkaishi, 2002, 26(4), pp. 258-262.

* cited by examiner

*Primary Examiner*—Stevan A. Resan
(74) *Attorney, Agent, or Firm*—Sughrue Mion, PLLC

(57) ABSTRACT

To provide a magnetic recording medium which undergoes little effect of thermal fluctuation and provides a high short wavelength output and C/N ratio when reproduction is conducted using MR head, the magnetic recording medium includes a non-magnetic layer having a non-magnetic powder dispersed in a binder provided on a support and a magnetic layer having a ferromagnetic powder dispersed in a binder provided on the non-magnetic layer, wherein the ferromagnetic powder comprises a hexagonal ferrite magnetic powder having an average diameter of from 10 to 35 nm and a coercive force of from 135 to 400 kA/m; the magnetic layer has a coercive force of from 135 to 440 kA/m; and a product of an anisotropic magnetic field of the magnetic layer and an average particle volume of the hexagonal ferrite magnetic powder is from $1.2 \times 10^6$ to $2.4 \times 10^6$ kA/m·nm$^3$.

8 Claims, 1 Drawing Sheet

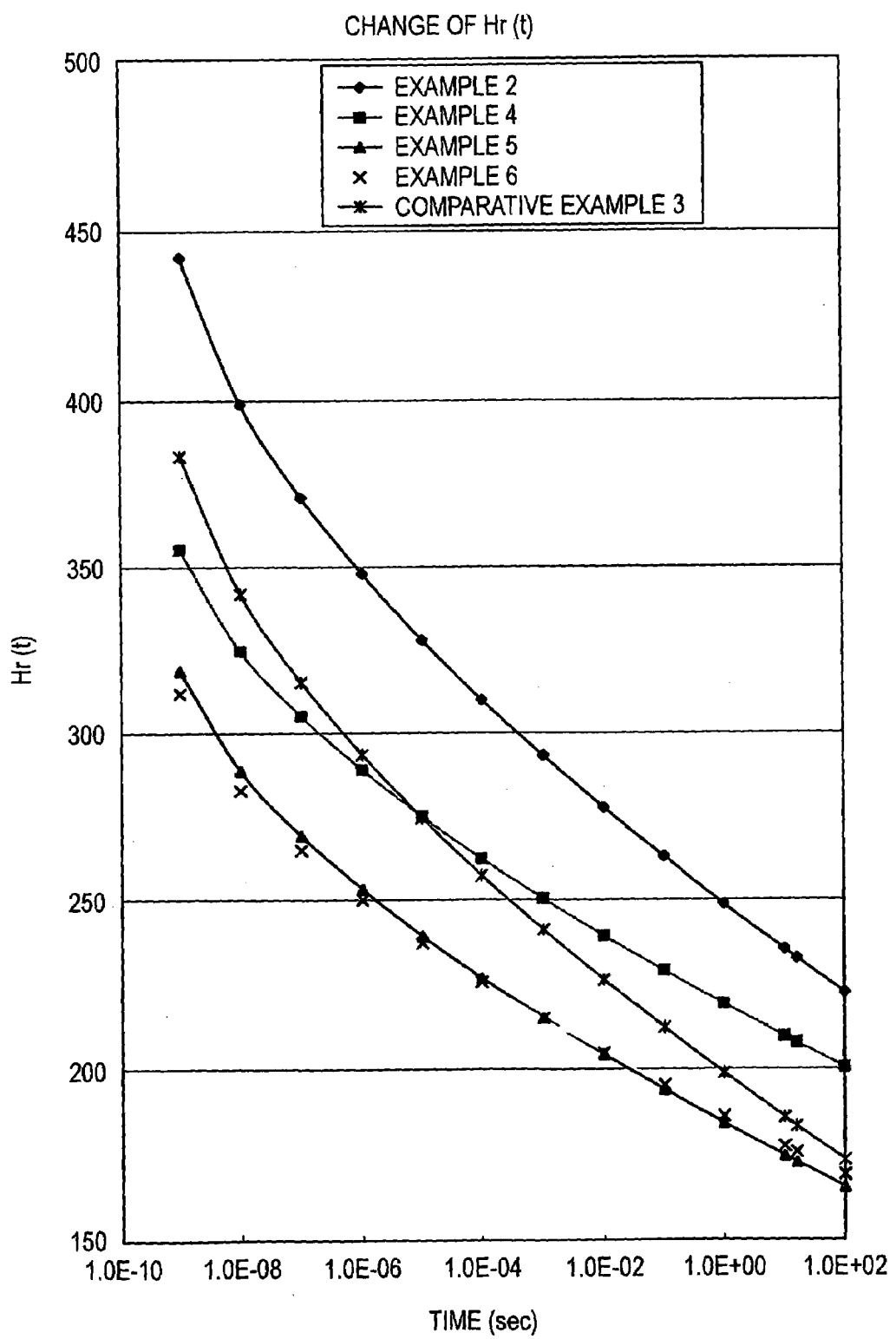

MAGNETIC RECORDING MEDIUM

BACKGROUND OF THE INVENTION

1. Field of the Invention

The present invention relates to a magnetic recording medium such as magnetic tape, more particularly to a magnetic recording medium comprising a magnetic layer formed by spreading a magnetic coating solution that mainly comprises a ferromagnetic powder and a binder, and a high density-recording magnetic recording medium having a hexagonal ferrite incorporated in a magnetic layer, particularly suitable for use in a system using an MR head utilizing a magnetoresistance effect for reproduction.

2. Background Art

A magnetic recording technique has found wide application to video, computer, etc. because it has excellent advantages which are not obtained in other recording methods, that is, it allows repeated use of medium, it provides easy electronization of signal to allow system construction by the combination with peripheries and it allows easy correction of signal.

In order to meet demands such as reduction of size of apparatus, enhancement of the quality of recorded/reproduced signal, prolongation of recording and rise of recording capacity, it has always been desired to provide recording medium with higher recording density, reliability and durability. For example, in order to cope with the practical use of digital recording system for the realization of enhancement of sound quality and image quality and the development of recording system corresponding to high definition TV, it has been more keenly desired to provide a magnetic recording medium which allows recording/reproduction of short wavelength signal and exhibits an excellent reliability and durability even when the speed thereof relative to head is raised. For computer use, too, it has been desired to develop a large capacity digital recording medium for storing an increasing amount of data. In the art of magnetic disc, too, it has been desired to provide a flexible disc with a larger capacity since the capacity of data to be processed is suddenly increasing today. A large capacity disc comprising a ferromagnetic metal powder excellent in high density recording properties has been put in practical use in the form of flexible disc having a density as high as 100 MB or more. However, a system having a larger capacity and a high transferring rate has been required.

In order to attain a high recording density in magnetic recording medium, there is a strong trend for more signals to be used in short wavelength range. When the length of the region in which signals are recorded stands comparison with the size of the magnetic material used, a definite magnetization transition state cannot be formed, substantially disabling recording. It is thus necessary to develop a magnetic material having a particle size which is sufficiently smaller than the shortest wavelength to be used. Therefore, size reduction of magnetic material has long been desired.

Referring to metal powders for magnetic recording, the particles are acicular and provided with anisotropy in profile to obtain the desired coercive force. It is well known to those skilled in the art that for high density recording, a ferromagnetic metal powder is needed to be finely divided so that the resulting magnetic recording medium has a smaller surface roughness. However, as more finely divided, the magnetic recording metal powder has a smaller acicularity ratio and thus can more difficultly provide the desired coercive force.

Magnetic tapes to be used in digital signal recording system are dedicated each for system. Magnetic tapes for so-called 3480 type, 3490 type, 3590 type, QIC type, D8 type and DDS type systems are known. Magnetic tapes for use in these systems each comprise a single magnetic layer having a thickness as relatively great as 2.0 to 3.0 $\mu$m comprising a ferromagnetic powder, a binder and an abrasive provided on one side of a non-magnetic support and a back coat layer provided on the other for preventing disturbance in winding or keeping a good running durability. However, the aforementioned relatively thick single magnetic layer is disadvantageous in that it undergoes self-demagnetization during recording and thickness loss causing output drop during reproduction.

It is known that the thickness of the magnetic layer is reduced to eliminate the drop of reproduced output due to the thickness loss of the magnetic layer. For example, JP-A-5-182178 discloses a magnetic recording medium comprising a lower non-magnetic layer having an inorganic powder dispersed in a binder and an upper magnetic layer having a thickness of 1.0 $\mu$m or less comprising a ferromagnetic powder dispersed in a binder provided on a non-magnetic support wherein the upper magnetic layer is formed while the non-magnetic layer is wet. For DLT type system, high capacity DDS type system and LTO system, coated magnetic recording medium comprising a magnetic layer having a thickness of from 0.2 to 0.4 $\mu$m provided on a lower non-magnetic layer has been put in practical use.

As magnetic recording medium such as video tape, computer tape and flexible disc there have heretofore been widely used those comprising a magnetic layer having a ferromagnetic iron oxide, Co-modified ferromagnetic ion oxide, $CrO_2$, ferromagnetic metal powder, hexagonal ferrite or the like dispersed in a binder spread over a support. Among these magnetic materials, hexagonal ferrite is known to have excellent high density recording properties (see JP-A-60-157719, JP-A-62-109226 and JP-A-3-280215). JP-A-5-12650 discloses that when the thickness of a magnetic layer comprising the ferrite is predetermined to a range of from 0.1 $\mu$m to 0.6 $\mu$m and a non-magnetic layer having a thickness greater than the magnetic layer is provided interposed between the magnetic layer and the support, the resulting magnetic recording medium has improved surface properties, short wavelength output, erasing properties and durability. JP-A-5-225547 discloses a magnetic recording medium comprising a non-magnetic layer provided on a support and a magnetic layer having a magnetic powder having a size of 0.1 $\mu$m or less dispersed therein provided on the non-magnetic layer. It is thus disclosed that a magnetic recording medium having excellent high frequency range properties and good signal overwriting properties and durability is provided.

The recent trend is for more computer data recording systems to use a high sensitivity reproducing head (MR head) utilizing a magnetoresistance effect. Thus, systems providing a high S/N ratio have been developed. In these systems, the system noise is governed by noises derived from the magnetic recording medium used. In other words, it is essential that the magnetic recording medium for systems comprising MR head generate reduced level of noises. Further, it is necessary that both the desired running durability and proper head cleaning effect allowing the prevention of head stain be attained at the same time. JP-A-7-182646 proposes that a medium comprising Ba ferrite be reproduced as MR head. It is known that in the case where a medium is reproduced as MR head, when the product of the magnetization of magnetic tape and the thickness of the magnetic tape is not smaller than half the magnetization per unit volume of MR element, MR head undergoes saturation and hence deterioration of characteristics (see A. Okabe et al., IEEE Trans. MAG., 1996, MAG-32.3404), making it necessary that the magnetic tape be redesigned. It is thus necessary that the particle size of ferromagnetic powder to be incorporated in the magnetic layer, the abrasive, the filler for forming protrusions on the surface of the tape, the thickness of the magnetic layer, etc. be reviewed.

JP-A-3-286420 and IEEE Trans. MAG., November 1988, vol. 24 (6), p. 2850, etc. disclose that the anisotropic magnetic filed Hk of hexagonal ferrite has an effect on the electromagnetic characteristics of a magnetic recording medium. JP-A-3-286420 discloses a magnetic recording medium comprising two magnetic layers provided on a non-magnetic layer wherein the lower magnetic layer has a longitudinal axis of easy magnetization and the upper magnetic layer comprises a magnetic powder having an anisotropic magnetic field (Hk) of 239 kA/m or less incorporated therein, whereby a magnetic recording medium capable of producing a high output over a wide range of from short wavelength to long wavelength can be provided. JP-A-8-115518 proposes a high density recording medium having Hc of from 103.5 to 398 kA/m, Hc/Hk of from 0.30 to 1.0 and an in-plane squareness ratio SQ of from 0.65 to 1.00. The high density recording medium thus proposed is characterized in that the range of the various numeral values of Hc, Hc/Hk and in-plane squareness ratio SQ of the magnetic layer comprising hexagonal ferrite are predetermined, making it possible to drastically enhance the extremely short wavelength output required for high density recording. However, this high density recording medium is disadvantageous in that when used as MR head, the resulting noises are high.

In order to reduce noises from medium, there is a trend for size reduction of ferromagnetic particles. However, it is presumed that the size reduction of ferromagnetic particles will be accompanied by the effect of thermal fluctuation that affects the stability of the magnetization transition region. The stability of magnetization is evaluated by KuV/kT (in which Ku is a magnetic anisotropy constant, V is the volume of particle, k is Boltzmann's constant and T is absolute temperature). For the details of particle volume and thermal fluctuation of metallic tape, reference can be made to Toshiyuki Suzuki et al., "Shingaku Giho", Nov. 21, 1997, MR97-55, P. 33–40.

Unlike ferromagnetic metal powder, hexagonal ferrite is not likely to undergo oxidation. However, hexagonal ferrite exhibits saturated magnetization of from about ⅓ to ½ of ferromagnetic metal powder. Accordingly, hexagonal ferrite can difficultly have a great Ku value and thus undergoes a great effect of thermal fluctuation.

It is said that a magnetic recording medium comprising hexagonal ferrite has a great mutual interaction between particles that affects the noise level of the medium. It is also said that when the mutual interaction between particles is great, the resulting stability of magnetization is excellent. However, it is likely that when inversion of magnetization occurs due to some reasons, the surrounding magnetic material, too, can undergo inversion of magnetization. Probably for this reason, it is disadvantageous in that desired C/N ratio can difficultly be sufficiently obtained when a high density recording medium formed by a hexagonal ferrite magnetic powder having a reduced particle size is reproduced as MR head. For the details of stability of magnetization of Ba ferrite medium, reference can be made to Tanaka and Suzuki, "Nihon Oyo Jiki Gakkaishi", 2002, 26 (4), P. 258–262. Tanaka et al estimated the intensity of inversed magnetic field in a short period of time as used in head recording by the residual coercive force (Hr) using a vibrating sample magnetometer and a pulse magnetic field generator to estimate the effective KuV/kT. The estimation thus obtained indicates from 1.5 to 1.8 times Hr measured by the vibrating sample magnetometer, i.e., 422 to 478 kA/m. This means that magnetic recording can be difficultly made unless the head current is raised.

SUMMARY OF THE INVENTION

The invention has been worked out in the light of the aforementioned problems with the related art. An aim of the invention is to provide a magnetic recording medium which undergoes little effect of thermal fluctuation paying attention to the anisotropic magnetic field of magnetic recording medium comprising a finely divided hexagonal ferrite powder and the volume of the hexagonal ferrite used. Another aim of the invention is to provide a magnetic recording medium which gives a high short wavelength output and C/N ratio when reproduction is conducted using MR head.

The aim of the invention is accomplished with a magnetic recording medium, which comprises: a support; a non-magnetic layer comprising a binder and a non-magnetic powder; and a magnetic layer comprising a binder and a ferromagnetic powder, wherein the ferromagnetic powder comprises a hexagonal ferrite magnetic powder having an average major diameter of from 10 to 35 nm and a coercive force of from 135 to 400 kA/m; the magnetic layer has a coercive force of from 135 to 440 kA/m; and a product of an anisotropic magnetic field of the magnetic layer and an average particle volume of the hexagonal ferrite magnetic powder is from $1.2 \times 10^6$ to $2.4 \times 10^6$ kA/m·nm$^3$. The average particle volume of the aforementioned magnetic powder is preferably from 2,000 to 5,000 nm$^3$ from the standpoint of S/N ratio of the magnetic recording medium. In the invention, the thickness of the magnetic layer are preferably from 0.01 to 0.5 $\mu$m, and the product of the residual magnetic flux density and the thickness of the magnetic layer are preferably from 0.5 to 100 mT·$\mu$m.

The invention can be expected to provide a magnetic recording medium which exhibits a high output and C/N ratio, allows high density recording and shows little signal attenuation even after prolonged storage.

BRIEF DESCRIPTION OF THE DRAWING

The sole FIGURE is a graph illustrating the relationship between Hr(t) calculated on Examples 2, 4, 5 and 6 and time wherein 1.0E-10 on the abscissa means $1.0 \times 10^{-10}$ (This applies to other figures).

DETAILED DESCRIPTION OF THE INVENTION

The invention is characterized in that the range of the size, volume and magnetic properties of the hexagonal ferrite magnetic powder, the coercive force (Hc) of the magnetic layer containing the hexagonal ferrite magnetic powder and the product of the anisotropic magnetic field (Hk) and the average particle volume (V(TEM)) of the magnetic powder (Hk×V(TEM)) are predetermined. In this arrangement, the thermal fluctuation can fall within a predetermined range, allowing recording without passing great current through the recording head.

For Hk in Hk×V(TEM), the value of rotational hysteresis loss Wr was measured starting with low magnetic field until it reached 796 kA/m. The measurements were then plotted versus the reciprocal of magnetic field applied (1/H). The data of Wr curve on the high magnetic field side were then subjected to two-dimensional curve approximation. The magnetic field at which Wr is 0 was then determined as Hk.

Hk×V(TEM) is controlled to a range of from $1.2 \times 10^6$ to $2.4 \times 10^6$ kA/m·nm$^3$.

In order to control Hk×V(TEM) to a desired value, Hk and V(TEM) are controlled. Hk can be adjusted by controlling the formulation and profile (thickness, aspect ratio) of the hexagonal ferrite magnetic powder. The greater Hk is, the greater is Ku. Thus, it is preferred that Hk be greater to accomplish the aim of the invention of enhancing the thermal stability of magnetization. In the invention, Hk is preferably from 239 to 1,200 kA/m, particularly from 250 to 1,100 kA/m. V(TEM) of the magnetic powder that takes part in the aforementioned profile will be further described later.

Hc of the magnetic layer containing the aforementioned magnetic powder is controlled to from 135 to 440 kA/m, preferably from 150 to 400 kA/m.

The predetermination of Hc depends greatly on the properties of the head for use in recording. In the invention, a head made of a high saturated magnetic flux density (Bs) material such as Fe—Ta—N can be used to obtain a high recording density to advantage. It is preferred that the higher Hc is, the smaller is the thickness of the magnetic layer.

Further, Hc/Hk is preferably controlled to a range of from 0.3 to 0.7, more preferably from 0.35 to 0.65.

In the invention, in order to assure the aforementioned properties of the magnetic layer, the average major axis length and the coercive force Hc of the hexagonal ferrite magnetic material to be used in the magnetic layer are predetermined to a range of from 10 to 35 nm and a range of from 135 to 400 kA/m, preferably from 150 to 400 kA/m, respectively.

In order to prevent the drop of reproduced output caused by the saturation of MR head, the product of the residual magnetic flux density (Br) and thickness ($\delta$) of the magnetic layer (Br×$\delta$) is preferably from 0.5 to 100 mT·$\mu$m. The residual magnetic flux density is preferably from 50 to 150 mT, more preferably from 60 to 140 mT. The thickness of the magnetic layer is preferably from 0.01 to 0.4 $\mu$m, more preferably from 0.02 to 0.3 $\mu$m.

The hexagonal ferrite magnetic powder to be incorporated in the magnetic layer (also referred to as "upper layer") will be further described hereinafter. Examples of the hexagonal ferrite magnetic powder to be incorporated in the upper layer of the invention include barium ferrite, strontium ferrite, lead ferrite, calcium ferrite, and various substitution products such as Co-substitution product thereof. Specific examples of these ferrites include magnetoplumbite-type barium ferrite and strontium ferrite, and magnetoplumbite-type barium ferrite and strontium ferrite partially containing spinel phase. These ferrites may contain atoms such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge and Nb other than predetermined atoms. In general, those having elements such as Co—Ti, Co—Ti—Zr, Co—Nb, Co—Ti—Zn, Co—Zn—Nb, Ni—Ti—Zn, Nb—Zn, Ni—Ti, Zn—Ti and Zn—Ni incorporated therein may be used. From the standpoint of SFD (switching field distribution), pure magnetoplumbite-type ferrites are preferred to composite type ferrites containing much spinel phases. In order to control the coercive force, a method which comprises controlling the formulation, particle diameter and particle thickness, a method which comprises controlling the thickness of spinel phase of hexagonal ferrite, a method which comprises controlling the substitution site of spinel phase or the like may be employed.

The hexagonal ferrite magnetic powder to be used in the invention is normally a powder in the form of hexagonal plate. The size of the hexagonal ferrite magnetic powder is measured in the following manner.

In the present specification, the size of various powders such as hexagonal ferrite magnetic powder (hereinafter referred to as "powder size") is determined by photograph taken under a high resolution transmission electron microscope (TEM). In some detail, the powder size is represented by (1) the length of the major axis constituting the powder in the case where the powder is in the form of needle, spindle, column (having a height greater than maximum diameter of bottom) or the like, (2) the maximum diameter of the surface or bottom in the case where the powder is in the form of tablet or column (having a thickness or height smaller than maximum diameter of surface or bottom) or (3) the diameter as calculated in terms of circle in the case where the powder is spherical, polyhedral, amorphous or otherwise and the major axis constituting the powder cannot thus be predetermined from its profile. The diameter as calculated in terms of circle is determined by circle projection method.

The average size of the powder is an arithmetic mean of measurements of the size of the powder. About 350 primary particles are measured in the aforementioned manner. The term "primary particle" as used herein is meant to indicate an independent unagglomerated particle.

In the case where the profile of the powder is specific, e.g., the aforementioned definition (1) of powder size, the average powder size is referred to as "average major axis length" and the arithmetic mean of (major axis length/minor axis length) is referred to as "average aspect ratio (average acicularity ratio)". The term "minor axis length" as used herein is meant to indicate the maximum length of axis perpendicular to the major axis. In the case of the definition (2), the average powder size is referred to as "average diameter" and the arithmetic mean of (tablet diameter/tablet thickness) is referred to as "average aspect ratio (average tabular ratio)". The term "tablet thickness" as used herein is meant to indicate the thickness or height of the tablet. In the case of the definition (3), the average powder size is referred to as "average particle diameter".

In the invention, the average diameter of the hexagonal ferrite magnetic powder is from 10 nm to 35 nm, preferably from 15 nm to 35 nm. The average thickness of the hexagonal ferrite magnetic powder is preferably from 2 nm to 15 nm, particularly from 4 nm to 10 nm. Further, the average ratio of the hexagonal ferrite magnetic powder is preferably from 1.5 to 4, more preferably from 2 to 3.8. When the average diameter is less than 10 nm, the resulting magnetic powder has a high specific surface area and thus can be difficultly dispersed in the binder to disadvantage. The specific surface area ($S_{BET}$) of the hexagonal ferrite magnetic powder by BET process is normally from 30 to 120 m$^2$/g, preferably from 40 to 100 m$^2$/g. When the specific surface area of the hexagonal ferrite magnetic powder falls below 30 m$^2$/g, the resulting magnetic recording medium generates high noise. On the contrary, when the specific surface area of the hexagonal ferrite magnetic powder exceeds 120 m$^2$/g, the magnetic powder can be difficultly dispersed in the binder, making it difficult to obtain desired surface properties. The volume (V(TEM)) of the hexagonal ferrite magnetic powder is calculated as calculated in terms of hexagonal column from the average diameter and average thickness thus determined above. V(TEM) is preferably from 2,000 to 5,000 nm$^3$, more preferably from 2,500 to 5,000 nm$^3$.

The water content of the hexagonal ferrite magnetic powder is preferably from 0.3 to 2.0%. The water content of the hexagonal ferrite magnetic powder is preferably optimized depending on the kind of the binder used. The pH value of the hexagonal ferrite magnetic powder is preferably optimized by the combination with the binder used. The range of pH value of the magnetic powder is from 4 to 12, preferably from 6 to 10. The hexagonal ferrite magnetic powder may be subjected to surface treatment with aluminum, silicon, phosphorus, zirconium, magnesium or oxide or hydroxide thereof as necessary. Preferably, the surface treatment with $Al_2O_3 \cdot nH_2O$ or $SiO_2 \cdot nH_2O$ is effected. The amount and ratio of such a surface treatment agent to be used preferably varies. The amount of such a surface treatment agent to be used is preferably from 0.1 to 10% by weight based on the amount of the binder. When surface treatment is effected with such a surface treatment agent in this amount, the adsorption of the lubricant such as aliphatic acid can be reduced to 100 mg/m$^2$ or less to advantage. The hexagonal ferrite magnetic powder may contain inorganic ions such as Na, Ca, Fe, Ni, Ba and Sr ions. The sum of the content of these inorganic ions is preferably less. However, when the content of these inorganic ions is from 0 to 100 ppm or less, the properties of the magnetic powder are not remarkably affected. σs is 35 A·m$^2$/kg or more, preferably 40 A·m$^2$/kg or more. The tap density of the magnetic powder is preferably 0.5 g/ml or more, more preferably 0.8 g/ml or more. The production of the hexagonal ferrite magnetic powder can be accomplished by glass crystallization method, coprecipitation method, hydrothermal reaction method or the like. While any specific production method is selected in the invention, glass crystallization method is preferably used because finely divided particles having a good size distribution can be obtained.

As the binder resin of the magnetic layer in the magnetic recording medium of the invention there may be used any known thermoplastic resin, thermosetting resin, reactive resin or mixture thereof. The thermoplastic resin employable herein has a glass transition temperature of from –100° C. to 150° C., a number-average molecular weight of from 1,000 to 200,000, preferably from 10,000 to 100,000, and a polymerization degree of from about 50 to 1,000.

Examples of such a binder resin include polymers or copolymers comprising vinyl chloride, vinyl acetate, vinyl alcohol, maleic acid, acrylic acid, acrylic acid ester, vinylidene chloride, acrylonitrile, methacrylic acid, methacrylic acid ester, styrene, butadiene, ethylene, vinyl butyral, vinyl acetal, vinyl ether, etc. as constituents, polyurethane resins, and various rubber-based resins.

Examples of the thermosetting resin or reactive resin employable herein include phenolic resin, epoxy resin, polyurethane-curing resin, urea resin, melamine resin, alkyd resin, acrylic reactive resin, formaldehyde resin, silicone resin, epoxy-polyamide resin, mixture of polyester resin and isocyanate prepolymer, mixture of polyester polyol and polyisocyanate, and mixture of polyurethane and polyisocyanate.

A binder resin obtained by incorporating one or more polar groups selected from the group consisting of COOM, $SO_3M$, $OSO_3M$, $P=O(OM)_2$, $O-P=O(OM)_2$ (in which M is a hydrogen atom or alkaline metal base), OH, $NR_2$, $N^+R_3$ (in which R is an alkyl group, alkenyl group, acyl group or allyl group), epoxy group, SH and CN in the aforementioned binder resin by copolymerization or addition reaction is preferably used. The amount of such a polar group is from $10^{-1}$ to $10^{-8}$ mol/g, preferably from $10^{-2}$ to $10^{-6}$ mol/g.

The binder resin to be incorporated in the magnetic recording medium of the invention is used in an amount of from 5 to 50% by weight, preferably from 10 to 30% by weight based on the amount of the ferromagnetic powder used. In the case where a vinyl chloride-based resin is used, the amount of the vinyl chloride-based resin is from 5 to 100% by weight. In the case where a polyurethane resin is used, the amount of the polyurethane resin is from 2 to 50% by weight. In the case where a polyisocyanate resin is used, the amount of the polyisocyanate resin is from 2 to 100% by weight. There resins are preferably used in combination in the above defined amount.

The packing of the hexagonal ferrite magnetic powder in the magnetic layer can be calculated from σs and maximum magnetic flux density (Bm) of the hexagonal ferrite magnetic powder used (Bm/4πσs). In the invention, the packing of the hexagonal ferrite magnetic powder is preferably from 1.1 to 3.2 g/cm$^3$, more preferably from 1.2 to 3.0 g/cm$^3$.

In the invention, the polyurethane resin, if used, preferably exhibits a glass transition temperature of from –50° C. to 100° C., an elongation of from 100 to 2,000% at break, a stress of from 0.05 to 10 Kg/mm$^2$ (0.49 to 98 MPa) at break and a yield point of from 0.05 to 10 Kg/mm$^2$ (0.49 to 98 MPa).

As the polyisocyanate to be used in the invention there may be used an isocyanate such as tolylene diisocyanate, 4,4'-diphenylmethane diisocyanate, hexamethylene diisocyanate, xylylene diisocyanate, naphthylene-1,5-diisocyanate, o-toluidiene diisocyanate, isophorone diisocyanate and triphenylmethane triisocyanate, a product of reaction of such an isocyanate with a polyalcohol, a polyisocyanate produced by the condensation of isocyanates or the like. Examples of trade name of commercially available versions of these isocyanates include Colonate L, Colonate HL, Colonate 2030, Colonate 2031, Millionate MR, Millionate MTL (produced by NIPPON POLYURETHANE INDUSTRY CO., LTD.), Takenate D-102, Takenate D-110N, Takenate D-200, Takenate D-202 (produced by Takeda Pharmaceutical Company Limited), Desmodur L, Desmodur IL, Desmodur N, Desmodur HL (produced by Sumitomo Bayer Co., Ltd.), etc. These polyisocyanates may be used singly. Alternatively, these polyisocyanates may be used in combination of two or more thereof by the use of the difference in curing reactivity.

The magnetic layer of the magnetic recording medium of the invention may normally comprise materials having various functions such as lubricant, abrasive, dispersant, antistatic agent, plasticizer and mildew proofing agent incorporated therein depending on the purpose thereof.

As the lubricant to be incorporated in the magnetic layer of the invention there may be used a silicon oil such as dialkyl polysiloxane (in which the alkyl moiety has from 1 to 5 carbon atoms), dialkoxy polysiloxane (in which the alkoxy moiety has from 1 to 4 carbon atoms), monoalkyl-monoalkoxy polysiloxane (in which the alkyl moiety has from 1 to 5 carbon atoms and the alkoxy moiety has from 1 to 4 carbon atoms), phenyl polysiloxane and fluoroalkyl polysiloxane (in which the alkyl moiety has from 1 to 5 carbon atoms), electrically-conductive fine powder such as graphite, inorganic powder such as molybdenum disulfide and tungsten disulfide, finely divided powder of plastic such as polyethylene, polypropylene, polyethylene chloride vinyl chloride copolymer and polytetrafluoroethylene, α-olefin polymer, saturated aliphatic acid (having from 10 to 22 carbon atoms) which normally stays solid, unsaturated aliphatic hydrocarbon (compound having about 20 carbon atoms having n-olefin double bond connected to the terminal carbon which normally stays liquid), aliphatic acid ester comprising $C_{12}$–$C_{20}$ monobasic aliphatic acid and $C_3$–$C_{12}$ monovalent alcohol or fluorocarbon.

Preferred among these lubricants are saturated aliphatic acids and aliphatic acid esters. More preferably, the two lubricants are used in combination. Examples of the alcohol which is a material of aliphatic acid ester include monoalcohols such as ethanol, butanol, phenol, benzyl alcohol, 2-methylbutyl alcohol, 2-hexyldecyl alcohol, propylene glycol monobutyl ether, ethylene glycol monobutyl ether, dipropylene glycol monobutyl ether, diethylene glycol monobutyl ether and s-butyl alcohol, and polyvalent alcohols such as ethylene glycol, diethylene glycol, neopentyl glycol, glycerin and sorbitan derivative. Examples of the aliphatic acid which is a material of aliphatic acid ester include aliphatic carboxylic acids such as acetic acid, propionic acid, octanoic acid, 2-ethylhexanoic acid, lauric acid, myristic acid, stearic acid, palmitic acid, behenicacid, arachicacid, oleicacid, linoleicacid, linolenic acid, eraidic acid and palmitoleic acid, and mixture thereof.

Specific examples of the aliphatic acid ester include various ester compounds such as butyl stearate, s-butyl stearate, isopropyl stearate, butyl oleate, amyl stearate, 3-methylbjutyl stearate, 2-ethylhexyl stearate, 2-hexyldecyl stearate, butyl palmitate, 2-ethylhexyl myristate, mixture of butyl stearate and butyl palmitate, butoxyethyl stearate, 2-butoxy-1-propyl stearate, product of acrylation of dipropylene glycol monobutyl ether with stearic acid, diethylene glycol dipalmitate, diol obtained by acylation of hexamethylene diol with myristic acid and oleate of glycerin.

Further, in order to eliminate hydrolysis of aliphatic acid ester that often occurs when the magnetic recording medium is used at high humidity, it is practiced to select anisotropic structure and branching position (branched/straight-chain, cis/trans) of aliphatic acid and alcohol which are materials of aliphatic acid ester.

These lubricants are normally added in an amount of from 0.2 to 20 parts by weight based on 100 parts by weight of the binder.

As the lubricant there may be used the following compounds as well. In some detail, silicon oil, graphite, molybdenum disulfide, boron nitride, graphite fluoride, fluoroalcohol, polyolefin, polyglycol, alkylphosphoric acid ester, tungsten disulfide, etc. may be used.

Examples of the abrasive to be incorporated in the magnetic layer of the invention include commonly used materials such as α-alumina, γ-alumina, molten alumina, corundum, artificial corundum, silicon carbide, chromium oxide ($Cr_2O_3$), diamond, artificial diamond, garnet, emery (main component: corundum and magnetite) and $\alpha Fe_2O_3$. These abrasives have a Mohs hardness of 6 or more. Specific examples of these abrasives include AKP-10, AKP-15, AKP-20, AKP-30, AKP-50, AKP-1520, AKP-1500, HIT-50, HIT60A, HIT60G, HIT70, HIT80, HIT82 and HIT-100 (produced by Sumitomo Chemical Co., Ltd.), G5, G7, S-1, chromium oxide K (produced by Nippon Chemical Industrial CO., LTD.), UB40B (produced by C. Uyemura & Co., Ltd.), WA8000, WA10000 (produced by Fujimi Kanmazai K. K.), LS600F 0/-1/4 (produced by LANDS Inc.), MD-200, MD-150, MD-100, MD-70, IRM 0-1/4F, IRM 0-1/4FF (produced by Tomei Diamond Co., Ltd.), 0-1/10, 0-1/4 (produced by GE Inc.), Mypolex 1/10QG, Mypolex 1/8QG (produced by Du Pont Inc.), and TF100, TF140, TF180 (produced by TODA KOGYO CORP.). Abrasives having an average particle diameter of from 0.05 μm to 1 μm, preferably from 0.05 μm to 0.5 μm can be used to advantage.

It is preferred that these abrasives be used not only singly but also in combination of two or more thereof. A fine divided diamond powder, if any, can be used in combination with other abrasives to reduce the amount thereof to be added to the magnetic material to about 0.1%. The sum of the amount of these abrasives is from 1 to 20 parts by weight, preferably from 1 to 15 parts by weight based on 100 parts by weight of the magnetic material. When the sum of the amount of these abrasives falls below 1 part by weight, sufficient durability cannot be obtained. On the contrary, when the sum of the amount of these abrasives exceeds 20 parts by weight, the resulting magnetic recording medium exhibits deteriorated surface properties and packing. These abrasives may be added to the magnetic coating solution in the form of dispersion in the binder.

The magnetic layer of the magnetic recording medium of the invention may comprise an electrically-conductive particulate material incorporated therein as an antistatic agent besides the aforementioned non-magnetic powder. As such an antistatic agent there is preferably used carbon black because the surface electrical resistance of the entire medium can be lowered. Examples of carbon black employable herein include furnace for rubber, thermal for rubber, black for color, electrically-conductive carbon black, and acetylene black. These carbon blacks preferably exhibit a specific surface area of from 5 to 500 $m^2/g$, a DBP oil absorption of from 10 to 1,500 ml/100 g, a particle diameter of from 5 to 300 nm, a pH value of from 2 to 10, a water content of from 0.1 to 10% and a tap density of from 0.1 to 1 $g/cm^3$. Specific examples of carbon black employable herein include BLACKPEARLS 2000, 1300, 1000, 900, 800, 700, VULCAN XC-72 (produced by Cabot Inc.), #80, #60, #55, #50, #35 (produced by Asahi Carbon Co., Ltd.), #3030B, #3040B, #3050B, #3230B, #3350B, #9180B, #2700, #2650, #2600, #2400B, #2300, #950B, #900, #1000, #95, #30, #40, #10B, MA230, MA220, MA77 (produced by MITSUBISHI CHEMICAL CORPORATION), CONDUC-TEX SC, RAVEN150, 50, 40, 15 (produced by Columbian Carbon Inc.), and Ketchen Black EC, Ketchen Black EDJ-500, Ketchen Black ECDJ-600 (produced by Lion Aczo Co., Ltd.). The carbon black which has been subjected to surface treatment with a dispersant, oxidation, grafting with a resin or graphitization on part thereof may be used. Alternatively, the carbon black may be added to the magnetic coating compound in the form of dispersion in a binder. In the case where carbon black is incorporated in the magnetic layer, the amount of carbon black based on the amount of the magnetic material may be from 0.1 to 30% by weight. The non-magnetic layer described later may comprise carbon black incorporated therein in an amount of from 3 to 20% by weight based on the total amount of the non-magnetic powder.

In general, carbon black does not only acts as an antistatic agent but also acts to reduce friction coefficient, provide light-shielding properties and enhance film strength. Different carbon blacks have different functions. Accordingly, these carbon blacks to be used in the invention can be properly used in different kinds, amounts and combinations depending the purpose on the basis of the aforementioned properties such as particle size, oil absorption, electrical conductivity and pH. For the details of carbon black employable herein, reference can be made to "Handbook of Carbon Black", Association of Carbon Black.

The magnetic recording medium comprising a magnetic layer containing the hexagonal ferrite magnetic powder of the invention is not specifically limited so far as it comprises a non-magnetic layer provided interposed between a support and a magnetic layer. A known layer configuration can be employed. The non-magnetic layer (lower layer) preferably comprises a non-magnetic powder dispersed in a binder resin. As the non-magnetic powder to be incorporated in the non-magnetic layer there may be used any non-magnetic powder. For example, α-alumina having a percent α conversion of 90% or more, β-alumina, γ-alumina, silicon carbide, chromium oxide, cerium oxide, α-iron oxide, goethite, corundum, silicon nitride, titanium carbite, titanium oxide, silicon dioxide, boron nitride, zinc oxide, calcium carbonate, calcium sulfate, barium sulfate, etc. may be used singly or in combination. As a non-magnetic powder having a uniform particle size distribution there is preferably used α-iron oxide, goethite, titanium oxide or lead oxide. The particle size of the non-magnetic powder is preferably from 0.01 to 1 $\mu$m. If necessary, non-magnetic powders having different particle sizes may be used in combination or a single non-magnetic powder having a wide particle size distribution may be used to exert the same effect. In order to raise the mutual interaction of the non-magnetic powder with the binder resin used and hence enhance the dispersibility thereof, the non-magnetic powder to be used may be subjected to surface treatment. The material to be present on the surface of the particles by surface treatment may be an inorganic material such as silica, alumina and silica-alumina or a product formed by a coupling agent. The non-magnetic powder preferably exhibits a tap density of from 0.3 to 2 g/cm3, a water content of from 0.1 to 5% by weight, a pH value of from 2 to 11 and a specific surface area of from 5 to 100 $m^2$/g. The aforementioned non-magnetic powder may be in the form of needle, sphere, cube or tablet.

Specific examples of the non-magnetic powder employable herein include Nanotite (produced by SHOWA DENKO K.K.), HIT-100, HIT-80 (produced by Sumitomo Chemical Co., Ltd.), α-iron oxide DPN-250BX, DPN-245, DPN-270BX, DPN-550BX, DPN-550RX, DBN-450BX, DBN-650RX, DAN-850RX (produced by TODA KOGYO CORP.), titanium oxide TTO-51B, TTO-55A, TTO-55B, TTO-55C, TTO-55S, TTO-55D, SN-100 (produced by ISHIHARA SANGYO KAISHA, LTD.), titanium oxide STT-4D, STT-30D, STT-30, STT-65C (produced by TITAN KOGYO KABUSHIKI KAISHA), titanium oxide MT-100S, MT-100T, MT-150W, MT-500B, MT-600B, MT-100F, MT-500HD (produced by TAYCA CORPORATION), FINEX-25, BF-1, BF-10, BF-20, ST-M (produced by SAKAI CHEMICAL INDUSTRY CO., LTD.), iron oxide DEFIC-Y, DEFIC-R (produced by Dowa Mining Co., Ltd.), AS2BM, TiO2 P25 (produced by NIPPON AEROSIL CO., LTD.), 100A, 500A (produced by Ube Industries, Ltd.), and product of sintering of these materials.

As mentioned above, the formation of a plurality of coat layers on a support is effective for the production of a high recording density magnetic recording medium. The coating method to be used in the invention is not specifically limited. For example, a successive coating method which comprises providing an upper layer after drying of a lower layer or a simultaneous coating method which comprises simultaneous provision of a lower layer and an upper layer may be employed. Among these coating methods, the simultaneous coating method is particularly excellent because it can form an ultra thin layer. Specific examples of the simultaneous coating method, i.e., wet-on-wet method will be given below.

(1) A method which comprises spreading a lower layer using a gravure coating apparatus, a roll coating apparatus, a blade coating apparatus or an extrusion coating apparatus commonly used for magnetic coating compound, and then spreading an upper layer over the lower layer using a support compressing extrusion coating apparatus disclosed in JP-P-1-46186, JP-A-60-238179 and JP-A-2-265672 while the lower layer is wet;

(2) A method which comprises spreading a lower layer coating solution and an upper layer coating solution at substantially the same time using a coating head having two coating solution passing slits as disclosed in JP-A-63-88080, JP-A-2-17971 and JP-A-2-265672 incorporated therein; and (3) A method which comprises spreading an upper layer and a lower layer at substantially the same time using an extrusion coating apparatus with backup roll disclosed in JP-A-2-174965.

In the case where the wet-on-wet process is used for spreading, it is preferred that the flow characteristics of the magnetic layer coating solution and the non-magnetic layer coating solution be as close as possible. In this arrangement, the resulting magnetic layer and the non-magnetic layer have no interface disturbance and the magnetic layer thus obtained has a uniform thickness with little fluctuation. Since the flow characteristics of a coating solution depends greatly on the combination of the powder particles and the binder resin in the coating solution, it is necessary that the selection of the non-magnetic powder to be incorporated in the non-magnetic layer be taken into account.

The support for the magnetic recording medium of the invention normally has a thickness of from 3 $\mu$m to 100 $\mu$m, preferably from 3 $\mu$m to 20 $\mu$m if used in the form of tape or from 25 $\mu$m to 80 $\mu$m if used in the form of flexible disc. The non-magnetic layer provided on the support normally has a thickness of from 0.5 $\mu$m to 5.0 $\mu$m, preferably from 0.5 $\mu$m to 3 $\mu$m. The magnetic layer preferably has a thickness of from 0.01 $\mu$m to 0.5 $\mu$m, more preferably from 0.05 $\mu$m to 0.3 $\mu$m. Further layers may be formed besides the aforementioned magnetic layer and non-magnetic layer depending on the purpose. For example, a subbing layer may be provided interposed between the support and the lower layer for enhancing adhesion. The thickness of the subbing layer is normally from 0.01 $\mu$m to 1 $\mu$m, preferably from 0.05 $\mu$m to 0.3 $\mu$m. A back layer may be provided on the side of the support opposite the magnetic layer. The thickness of the back layer is normally from 0.1 $\mu$m to 1.0 $\mu$m, preferably from 0.3 $\mu$m to 1.0 $\mu$m. As the subbing layer and the back layer there may be used any materials known as such. In the case where the magnetic recording medium is in the form of disc, a configuration may be employed comprising the aforementioned magnetic layer provided on one or both sides of the support.

The support to be used in the invention is not specifically limited. Any commonly used material may be used. Examples of the material constituting the support include film of various synthetic resins such as polyethylene terephthalate, polyethylene, polypropylene, polycarbonate, polyethylene naphthalate, polyamide, polyamideimide, polyimide, polysulfone and polyether sulfone, and metal foils such as aluminum foil and stainless steel foil.

In order to effectively accomplish the aim of the invention, the surface roughness of the support is 0.03 $\mu$m or less, preferably 0.02 $\mu$m or less, more preferably 0.01 $\mu$m or less as calculated in terms of centralline-average surface roughness Ra (cutoff value: 0.25 mm). It is preferred that the support not only have a small central line-average surface roughness but also be free of large protrusions having a size of 1 $\mu$m or more. The profile of surface roughness can be freely controlled by the size and amount of the filler to be optionally incorporated in the support. Examples of the filler employable herein include oxide and carbonate of calcium, aluminum, silicon and titanium, and finely divided powder of organic resin such as acrylic resin. The support to be used in the invention preferably has F-5 value of from 5 to 50 kg/mm$^2$ (40 to 490 MPa) in the web running direction or from 3 to 30 kg/mm$^2$ in the web crosswise direction. It is thus common that F-5 value in the web longitudinal direction is higher than F-5 value in the web crosswise direction. However, this is not always true if it is necessary that the crosswise strength of the support be raised more than the longitudinal strength of the support.

The percent heat shrinkage of the support in the web running direction and crosswise direction is preferably 3% or less, more preferably 1.5% or less at 100° C. in 30 minutes or preferably 1% or less, more preferably 0.5% or less at 80° C. in 30 minutes. The breaking strength of the support is preferably from 5 to 100 kg/mm$^2$ (49 to 980 MPa) in both the web running direction and crosswise direction. The elastic modulus of the support is preferably from 100 to 2,000 kg/mm$^2$ (980 to 19,600 MPa).

As the organic solvents to be used in the invention there may be used ketones such as acetone, methyl ethyl ketone, methyl isobutyl ketone, diisobutyl ketone, cyclohexanone, isophorone and tetrahydrofurane, alcohols such as methanol, ethanol, propanol, butanol, isobutyl alcohol, isopropyl alcohol and methyl cyclohexanol, esters such as methyl acetate, butyl acetate, isobutyl acetate, isopropyl acetate, ethyl lactate and glycol acetate, glycol ethers such as glycol dimethyl ether, glycol monoethyl ether and dioxane, aromatic hydrocarbons such as benzene, toluene, xylene, cresol and chlorobenzene, chlorinated hydrocarbons such as methylene chloride, ethylene chloride, carbon tetrachloride, chloroform, ethylene chlorohydrin and dichlorobenzene, N,N-dimethylformamide, hexane, etc. in an arbitrary ratio. These organic solvents don't need to be 100% pure but may contain impurities such as isomer, unreacted product, side reaction product, decomposition product, oxide and water content besides main component. The content of these impurities is preferably 30% or less, more preferably 10% or less. The organic solvents to be used in the invention may vary in their kind and amount from layer to layer. For example, a high volatility solvent may be used for the lower layer to enhance the surface properties thereof. A high surface tension solvent (e.g., cyclohexane, dioxane) may be used for the lower layer to enhance the coating stability. A solvent having a high solubility parameter may be used for the magnetic layer to enhance the packing thereof. It goes without saying that the invention is not limited to these examples.

The magnetic recording medium of the invention is obtained by knead-dispersing the aforementioned ferromagnetic powder and binder resin and optionally other additives in an organic solvent, spreading the magnetic coating compound thus obtained over a support, and then optionally orienting and drying the coated material.

The process for the production of the magnetic coating compound and the non-magnetic coating compound of the invention comprises at least a kneading step, a dispersing step, and a mixing step optionally provided before and after these steps. These steps may each comprise two or more stages. All the materials to be used in the invention, e.g., magnetic material, non-magnetic powder, binder, carbon black, abrasive, antistatic agent, lubricant, solvent may be added at the initial state or in the course of any steps. Further, these materials may each be added batchwise at two or more steps. For example, a polyurethane may be batchwise added at the kneading step, the dispersing step and the mixing step for viscosity adjustment after dispersion.

The kneading/dispersion of the magnetic coating compound can be accomplished by means of various kneaders. Examples of the kneaders employable herein include two-roll mill, three-roll mill, ball mill, pebble mill, Trommel mill, sand grinder, Szegvari, attritor, high speed impellor dispersing machine, high speed stone mill, high speed impact mill, disper, kneader, high speed mixer, homogenizer, and ultrasonic dispersing machine.

At the kneading step, a machine having a high kneading force such as continuous kneader and pressure kneader is preferably used to provide the magnetic recording medium with a high Br value. In the case where a continuous kneader or pressure kneader is used, the magnetic material and the whole or part (preferably 30% or more of the total amount of the binder) of the binder are kneaded in an amount of from 15 to 500 parts by weight of the magnetic material. For the details of the kneading step, reference can be made to JP-A-1-106338 and JP-A-64-79274. In the invention, a simultaneous multi-layer coating method as disclosed in JP-A-62-212933 can be employed for efficient production.

The content of residual solvents in the magnetic layer of the magnetic recording medium of the invention is preferably 100 mg/m$^2$ or less, more preferably 10 mg/m$^2$ or less and preferably is less than the content of residual solvents in the non-magnetic layer.

The void of the magnetic layer is preferably 30 vol-% or less, more preferably 10 vol-% for both the lower layer and uppermost layer. The void of the non-magnetic layer is preferably greater than that of the magnetic layer. However, the void of the non-magnetic layer may be smaller than that of the magnetic layer so far as it is 5 vol-% or more.

In the invention, it can be easily anticipated that physical properties may vary from the lower layer to the magnetic layer depending on the purpose. For example, the elastic modulus of the magnetic layer may be raised to enhance the running durability thereof while the elastic modulus of the lower layer may be predetermined to be lower than that of the magnetic layer to improve the softness in contact of the magnetic recording medium with the head.

In this manner, the magnetic layer and other layers spread over the support are optionally subjected to treatment for orientation of ferromagnetic powder therein. The magnetic layer thus formed is then dried. If necessary, the magnetic layer is worked for surface smoothening or cut into desired shape to produce the magnetic recording medium of the invention.

The magnetic layer preferably exhibits an elastic modulus of from 100 to 2,000 kg/mm$^2$ (980 to 19,600 MPa) at 0.5% elongation and a breaking strength of from 1 to 30 kg/cm2 (98 to 2,940 kPa) both in the web coating direction and crosswise direction. The magnetic recording medium preferably exhibits an elastic modulus of from 100 to 1,500 kg/mm$^2$ (980 to 14,700 MPa), a residual elongation of 0.5% or less and a percent heat shrinkage of 1% or less, more preferably 0.5% or less, even more preferably 0.1% or less at all temperatures below 100° C. both in the web coating direction and crosswise direction.

The magnetic recording medium of the invention may be a tape for use in video, computer backup, etc. or a flexible disc or magnetic disc for data recording but is particularly useful as medium for digital recording, in which lack of signal due to the occurrence of dropout is fatal. By employing a multi-layer configuration comprising a non-magnetic layer and a magnetic layer to predetermine the thickness of the magnetic layer to 0.4 μm or less, a high density large capacity magnetic recording medium having high electromagnetic characteristics and overwriting properties can be obtained.

Novel advantages of the invention will be further described hereinafter in the following examples.

EXAMPLE

The invention will be further described in the following examples, but the invention is not limited thereto.

<Production Process (1) of Hexagonal Ferrite Magnetic Powder>

As materials of a hexagonal ferrite magnetic powder there were measured out various compounds in the following formulation as calculated in terms of oxide. The amounts X, Y and Z of the following components and the magnetic powders thus obtained (Production Examples 1 to 6) are set forth in Table 1.

| $B_2O_3$ | 4.7 mols |
| $BaCO_3$ | 10.0 mols |
| $Fe_2O_3$ | X mols |
| $CoCO_3$ | Y mols |
| ZnO | Z mols |
| $Nb_2O_5$ | W mols |

$B_2O_3$, $BaCO_3$ and $Fe_2O_3$ were thoroughly stirred by a powder mixer. To the mixture were then added reducing elements ($CoCO_3$, ZnO, $Nb_2O_5$). The mixture was further stirred. The mixture was put in a crucible made of by Pt—Rh with an agitator where it was then melted at a temperature of from 1,300° C. to 1,340° C. for 3 hours. The molten mixture was then ejected into the gap between two cooling stainless steel rolls which were rotating to obtain an amorphous material which was then ground. Subsequently, the amorphous material was spread over a ceramic vessel to a thickness of 2 cm. The ceramic vessel was then conveyed into an electric furnace kept at 600° C. where it was kept for 2 hours. The ceramic vessel was immediumtely conveyed into an electric furnace kept at 660° C. where it was then kept for 5 hours. Thereafter, the material thus treated was put in a metallic hopper at room temperature so that it was cooled to obtain a crystal powder. The crystal powder thus obtained was ground by a planetary mill. The crystal powder thus ground was then dipped and kept in a 2 mol/l aqueous solution of acetic acid at 80° C. for 5 hours. The resulting glass component was then removed. A microcrystal was then recovered by filtration. The microcrystal thus recovered was washed with a large amount of ion-exchanged water, dehydrated, dried at 100° C., and then subjected to consolidation by a muller to obtain a ferromagnetic powder. The ferromagnetic powder thus obtained was then observed under transmission electron microscope. As a result, the ferromagnetic powder showed a magnetoplumbite structure. The average powder size was measured under transmission electron microscope. The ferromagnetic powder was deaerated at 250° C. in nitrogen for 30 minutes, and then measured for specific surface area by BET method. The magnetic properties of the ferromagnetic powder was measured at an applied magnetic field of 796 kA/m using VSM. The particle size, specific surface area and magnetic properties of the barium ferrite thus obtained are set forth in Table 1.

TABLE 1

| Magnetic powder Unit | X mol | Y mol | Z mol | W mol | Average diameter nm | Average thickness nm | V(TEM) nm³ | Specific surface area m²/g | Hc kA/m | σs A·m²/kg |
|---|---|---|---|---|---|---|---|---|---|---|
| Production Example 1 | 11.3 | 0.21 | 0.39 | 0.15 | 22.7 | 6.6 | 2,206 | 72.6 | 196.4 | 50.2 |
| Production Example 2 | 11.3 | 0.21 | 0.66 | 0.22 | 22.2 | 7.0 | 2,238 | 68.3 | 190.5 | 51.8 |
| Production Example 3 | 11.3 | 0.22 | 0.99 | 0.22 | 21.9 | 7.2 | 2,240 | 67 | 145.3 | 49.1 |
| Production Example 4 | 10.5 | 0.19 | 1.05 | 0.24 | 30.9 | 8 | 4,955 | 55.7 | 170.8 | 53.1 |
| Production Example 5 | 10.5 | 0.21 | 1.19 | 0.34 | 28.3 | 9.3 | 4,832 | 47.3 | 154.5 | 54.7 |
| Production Example 6 | 10.5 | 0.00 | 0.00 | 0.00 | 24.6 | 8.4 | 3,298 | 56.5 | 183.4 | 55.6 |

<Production Process (2) of Hexagonal Ferrite Magnetic Powder>

As materials of hexagonal ferrite magnetic powder there were measured out various compounds in the following formulation as calculated in terms of oxide.

| $B_2O_3$ | 10.0 mols |
| $BaCO_3$ | 11.9 mols |
| $Fe_2O_3$ | 11.4 mols |
| $CoCO_3$ | 0.20 mols |
| ZnO | 0.68 mols |
| $Nb_2O_5$ | 0.20 mols |

$B_2O_3$, $BaCO_3$ and $Fe_2O_3$ were thoroughly stirred by a powder mixer. To the mixture were then added reducing elements ($CoCO_3$, ZnO, $Nb_2O_5$). The mixture was further stirred. The mixture was put in a crucible made of by Pt—Rh with an agitator where it was then melted at a temperature of from 1,300° C. to 1,340° C. for 3 hours. The molten mixture was then ejected into the gap between two cooling stainless steel rolls which were rotating to obtain an amorphous material which was then ground. Subsequently, the amorphous material was spread over a ceramic vessel to a thickness of 2 cm. The ceramic vessel was then conveyed into an electric furnace kept at 600° C. where it was kept for 2 hours. The ceramic vessel was immediumtely conveyed into an electric furnace kept at a predetermined temperature set forth in Table 2 where it was then kept for 5 hours. Thereafter, the material thus treated was put in a metallic hopper at room temperature so that it was cooled to obtain a crystal powder. The crystal powder thus obtained was ground by a planetary mill. The crystal powder thus ground was then dipped and kept in a 2 mol/l aqueous solution of acetic acid at 80° C. for 5 hours. The resulting glass component was then removed. A microcrystal was then recovered by filtration. The microcrystal thus recovered was washed with a large amount of ion-exchanged water, dehydrated, dried at 100° C., and then subjected to consolidation by a muller to obtain a ferromagnetic powder. The ferromagnetic powder thus obtained was then observed under transmission electron microscope. As a result, the ferromagnetic powder showed a magnetoplumbite structure. The average powder size was measured under transmission electron microscope. The ferromagnetic powder was deaerated at 250° C. in nitrogen for 30 minutes, and then measured for specific surface area by BET method. The magnetic properties of the ferromagnetic powder was measured at an applied magnetic field of 796 kA/m using VSM. The particle size, specific surface area and magnetic properties of the barium ferrite thus obtained are set forth in Table 2.

TABLE 2

| Magnetic powder Unit | Temperature ° C. | Average diameter nm | Average thickness nm | V(TEM) nm$^3$ | Specific surface area m$^2$/g | Hc kA/m | δs A·m$^2$/kg |
|---|---|---|---|---|---|---|---|
| Production Example 7 | 630 | 20.8 | 6.2 | 1,740 | 84.9 | 121.8 | 47.2 |
| Production Example 8 | 660 | 25.4 | 7.3 | 3,055 | 66.2 | 147.3 | 51.5 |
| Production Example 9 | 710 | 28.8 | 8.5 | 4,574 | 61.3 | 169.2 | 53.7 |
| Production Example 10 | 760 | 36.3 | 9.6 | 8,207 | 53.8 | 179.2 | 55.1 |

<Preparation of Coating Compound>

The term "parts" as used hereinafter is meant to indicate "parts by weight".

| Magnetic coating solution formulation 1 | |
|---|---|
| Barium ferrite (as set forth in Table 3 of magnetic powder) | 100 parts |
| Binder resin | |
| Vinyl chloride copolymer (—SO$_3$K content: 1 × 10$^{-4}$ eq/g; polymerization degree: 300) | 12 parts |
| Polyester polyurethane resin (neopenthyl glycol/caprolactone polyol/MDI* = 0.9/2.6/1; —SO$_3$Na content: 1 × 10$^{-4}$ eq/g) | 4 parts |
| * methylene diphenyl isocyanate | |
| α-Alumina (average particle diameter: 0.15 μm) | 2 parts |
| Carbon black (average particle diameter: 30 nm) | 5 parts |
| Butyl stearate | 2 parts |
| Stearic acid | 2 parts |
| Methyl ethyl ketone | 125 parts |
| Cyclohexanone | 125 parts |
| Magnetic coating solution formulation 2 | |
| Barium ferrite (as set forth in Table 4 of magnetic powder) | 100 parts |
| Binder resin | |
| Vinyl chloride copolymer (—SO$_3$K content: 1 × 10$^{-4}$ eq/g; polymerization degree: 300) | 15 parts |
| Polyester polyurethane resin (neopenthyl glycol/caprolactone polyol/MDI = 0.9/2.6/1; —SO$_3$Na content: 1 × 10$^{-4}$ eq/g) | 6 parts |
| Phenylphosphonic acid | 3 parts |
| α-Alumina (average particle diameter: 0.15 μm) | 2 parts |
| Carbon black (average particle diameter: 30 nm) | 5 parts |
| Butyl stearate | 10 parts |
| Butoxyethyl stearate | 5 parts |
| Isohexadecyl stearate | 2 parts |
| Stearic acid | 3 parts |
| Methyl ethyl ketone | 125 parts |
| Cyclohexanone | 125 parts |
| Non-magnetic coating solution formulation 1 | |
| Acicular hematite (specific surface area by BET process: 55 m$^2$/g; average major axis length: 0.10 μm; average acicularity ratio: 7; pH: 8.8; aluminum treatment: 1% by weight as calculated in terms of Al$_2$O$_3$) | 80 parts |
| Carbon black (average particle diameter: 17 nm; DBP oil absorption: 80 ml/100 g; specific surface area by BET method: 240 m$^2$/g; pH: 7.5) | 20 parts |
| Binder resin | |
| Vinyl chloride copolymer (—SO$_3$K content: 1 × 10$^{-4}$ eq/g; polymerization degree: 300) | 12 parts |
| Polyester polyurethane resin (neopenthyl glycol/caprolactone polyol/MDI = 0.9/2.6/1; —SO$_3$Na content: 1 × 10$^{-4}$ eq/g) | 5 parts |
| Phenylphosphonic acid | 3 parts |
| Butyl stearate | 3 parts |
| Stearic acid | 3 parts |
| 1:1 Mixture of methyl ethyl ketone and cyclohexanone | 280 parts |
| Non-magnetic coating solution formulation 2 | |
| Acicular hematite (specific surface area by BET process: 55 m$^2$/g; average major axis length: 0.10 μm; average acicularity ratio: 7; pH: 8.8; aluminum treatment: 1% by weight as calculated in terms of Al$_2$O$_3$) | 80 parts |
| Carbon black (average particle | 20 parts |

-continued

| | |
|---|---|
| diameter: 17 nm; DBP oil absorption: 80 ml/100 g; specific surface area by BET method: 240 m$^2$/g; pH: 7.5) Binder resin | |
| Vinyl chloride copolymer (—SO$_3$K content: 1 × 10$^{-4}$ eq/g; polymerization degree: 300) | 15 parts |
| Polyester polyurethane resin (neopenthyl glycol/caprolactone polyol/MDI = 0.9/2.6/1; —SO$_3$Na content: 1 × 10$^{-4}$ eq/g) | 5 parts |
| Phenylphosphonic acid | 3 parts |
| α-Alumina (average particle diameter: 0.15 μm) | 2 parts |
| Carbon black (average particle diameter: 30 nm) | 5 parts |
| Butyl stearate | 10 parts |
| Butoxyethyl stearate | 5 parts |
| Isohexadecyl stearate | 2 parts |
| Stearic acid | 3 parts |
| 1:1 Mixture of methyl ethyl ketone and cyclohexanone | 280 parts |

Referring to the aforementioned magnetic coating solution formulations 1 and 2 and non-magnetic coating solution formulations 1 and 2, the pigment, the polyvinyl chloride and the phenylphosphonic acid and the various solvents in an amount of 50% by weight of the formulation were kneaded by a kneader. To the mixture was then added the polyurethane resin and the rest of the components. The mixture was then subjected to dispersion using a sand grinder. To the dispersion thus obtained an isocyanate in an amount of 15 parts for non-magnetic coating solution or 14 parts for magnetic coating solution. To the mixture was then added 30 parts of cyclohexanone. The mixture was then filtered through a filter having an average pore diameter of 1 μm to prepare a non-magnetic layer coating solution or a magnetic layer coating solution.

<Preparation Process (1) of Tape: Examples 1–7; Comparative Examples 1–3>

The lower non-magnetic layer coating solution 1 thus obtained was spread over a polyethylene terephthalate support having a thickness of 7 μm to a dry thickness of 1.5 μm. Wet simultaneous multi-layer coating was immediumtely conducted by controlling the spread of the magnetic layer such that a predetermined thickness of magnetic layer was reached while the lower non-magnetic coat layer thus spread was wet. The coated material was then passed through an orienting apparatus while the two layers were wet to undergo longitudinal orientation. During this orientation procedure, the coated material was passed through a rare earth magnet (surface magnetic flux density: 500 mT) and then through a solenoid magnetic (magnetic flux density: 500 mT). The material thus oriented was then dried until in the solenoid to an extent such that it cannot be oriented back to the original state. The magnetic layer was then further dried. The coated material was then wound. Thereafter, the coated material was subjected to calendering at a roll temperature of 90° C. in a 7-stage calender comprising metallic rolls to obtain web-shaped magnetic recording medium which was then slit to a width of 8 mm to prepare a 8 mm video tape sample. Using a vibrating sample magnetometer, the sample was measured for magnetic properties and remanence curve. Using a pulse magnetic field generator, the sample was measured for remanence curve and hence residual coercive force (Hr). Further, the sample was measured for surface roughness and electromagnetic characteristics.

<Preparation of Flexible Disc; Examples 8, 9; Comparative Example 4>

The coating solution of lower non-magnetic layer formulation 2 thus obtained was spread over a polyethylene terephthalate support having a thickness of 68 μm to a dry thickness of 1.5 μm. Wet simultaneous multi-layer coating was immediumtely conducted by changing the spread of the magnetic layer coating solution of magnetic coating solution formulation 2 such that the thickness of the magnetic layer was varied while the lower non-magnetic coat layer thus spread was wet. The coated material was then passed through a rare earth magnetic having the same poles disposed opposed to each other at a central magnetic field of 398 kA/m while the two layers were wet to undergo longitudinal orientation. The coated material was then passed through two magnetic field alternating magnetic field generators having a magnetic field intensity of 24 kA/m at a frequency of 50 Hz and 12 kA/m at a frequency of 50 Hz, respectively, to undergo random orientation. As a result, an orientation ratio of 98% or more was obtained.

The support was then subjected to spreading, orientation and drying on the other side thereof in the same manner as mentioned above. The coated material was then subjected to treatment at a temperature of 90° C. and a linear pressure of 300 kg/cm (294 kN/m) using a 7-stage calender. The coated material thus treated was punched into a disc having a diameter of 3.7 inch which was then subjected to thermal treatment (70° C., 24 hours) to accelerate curing of the coat layer. The coated material was then subjected to varnishing with an abrasive tape so that it was post-treated to scrape surface protrusions. The coated material thus cut was put in a 3.7 inch cartridge having a liner provided in the inner wall thereof (ZIP disc cartridge produced by IOMEGA INC.) and then provided with predetermined mechanism parts to obtain a 3.7 inch flexible disc.

Using a pulse magnetic field generator, the sample was measured for remanence curve and hence residual coercive force (Hr). Further, the sample was measured for surface roughness and electromagnetic characteristics.

<Evaluation of Tape>

The sample thus obtained was then measured for magnetic properties using a vibrating sample magnetometer, surface roughness and electromagnetic characteristics.

The measurement of electromagnetic characteristics was carried out in the following manner. A MIG head (head gap: 0.2 μm; track width: 17 μm; saturated magnetic flux density: 1.5 T; azimuth angle: 20°) and a reproduction MR head (SAL bias; MR element: Fe—Ni; track width: 6 μm; gap length: 0.2 μm; azimuth angle: 20°) were mounted on a 8 mm deck for date recording. The MIG head was adjusted to control the speed of the tape relative to the head to 10.2 m/sec. The input/output characteristics at 1/2Tb (λ=0.5 μm) were then used to determine the optimum recording current with which a signal was recorded. The signal thus recorded was then reproduced by the MR head. C/N ratio is defined to ratio of peak in reproduction carrier to demagnetization noise. The resolution band width of the spectral analyzer was 100 KHz. The properties of the sample were represented relative to that of the tape of Comparative Example 2.

<Evaluation of Flexible Disc>

The output of the flexible disc sample was measured at a linear recording density of 144 kbpi and a track density of 144 tpi. The output and error rate of the sample were represented relative to that of Comparative Example 4. The track density is the number of tracks per inch. The product of multiplication of linear recording density by track density is plane recording density. The error rate of the disc was measured by recording a signal having the aforementioned linear recording density on the disc in (2, 7) RLL modulation mode.

For the measurement of surface roughness, light interference three-dimensional roughness meter "TOPO-3D" (produced by WYKO Inc.) was used. The measurement was made on a 250 μm square on the sample surface. For the calculation of measurements, correction such as inclination correction, spherical correction and cylindrical correction was effected according to JIS-B601. The central surface average roughness Ra was defined as surface roughness.

For the measurement of the magnetic properties of the tape sample, a vibrating sample magnetometer (produced by Toei Kogyo K.K.) was used. The measurement was effected parallel to the orientation direction in an external magnetic field of 796 kA/m. During the measurement, the disc sample was disposed parallel to the longitudinal direction of the support. For the measurement of residual coercive force Hr (VSM), the magnetic recording medium sample to be measured was mounted on the vibrating sample magnetometer in such an arrangement that the orientation direction of the sample is parallel to the direction of magnetic field. A magnetic field of −796 kA/m was applied to the sample to cause DC saturation. The magnetic field was then returned to zero. The residual magnetization (−Mrmax) was then measured. A magnetic field of 7.96 kA/m was applied to the sample in the opposite direction. The magnetic field was then returned to zero. The residual magnetization Mr was then measured. The applied magnetic field was then varied by 7.96 kA/m. Each time of variation, the residual magnetization was measured. This procedure was repeated. Thus, remanence curve Id (H) was measured. The magnetic field at which Id(H) is 0 was defined to be Hr(VSM). The time required until the predetermined magnetic field was reached during remanence measurement was about 16 seconds. A magnetic field of −796 kA/m was then applied to the same sample to cause DC saturation. The sample was then measured for residual magnetization. A pulse magnetic field (time during which pulse is applied was 1.6 msec) was then applied to the sample in the opposite direction. The sample was then measured for residual magnetization using a vibrating sample magnetometer. A pulse magnetic filed applied to the sample at an interval of 17.15 kA/m. The sample was then measured for Id(H) under pulse magnetic field. The magnetic field at which Id(H) is 0 was defined to be Hr (pulse).

For the measurement of magnetic torque, a magnetic torque meter (TRT-2-15-AUT) (produced by Toei Kogyo K.K.) was used. The measurement was made over a range of from low magnetic field to 796 kA/m to determine Hk and Ku. For the determination of Hk, rotational hysteresis loss Wr was measured over a range of from low magnetic field to 796 kA/m. The measurements were then plotted versus the reciprocal 1/H of applied magnetic field. The data on high magnetic field side on Wr curve was then subjected to two-dimension curve approximation. The magnetic field at which Wr is 0 was then determined as Hk. Hk and the magnetization per unit volume wherein the specific gravity of the magnetic material was 5 were used to determine Ku. Vac (activated volume) was then calculated from Hr (VSM) and Hr (pulse) by the equation (1) according to the report made by Tanaka and Suzuki (Journal of The Magnetics Society of Japan, 26 (4), p. 258–262 (2002).

$$Hr(t)/Hco = 1 - [(kT/KuV)\ln(At/0.693)]^n \quad (1)$$

wherein A is 1069 and n is 0.59.

Hr(t) is the residual coercive force developed when the predetermined magnetic field is reached. Hro is the residual coercive force developed when there is no effect of thermal disturbance. Hr (pulse) was used to determine Hro. Using the equation (1), Hr(t) was calculated. The thermal fluctuation was then evaluated by $\Delta$Hr/Hr (VSM)=[Hr($10^{-9}$ sec) −Hr(16 sec)]/Hr(VSM).

The smaller $\Delta$Hr/Hr(VSM) is, the smaller is the effect of thermal fluctuation.

For the determination of the thickness δ of the magnetic layer, the magnetic recording medium was cut longitudinally using a diamond cutter to a thickness of about 0.1 μm. The sample was then observed and photographed under transmission electron microscope at 50,000× magnification. The print size of photograph ranged from A4 to A5. The comprehensive magnification of the printed matter was 200,000. Thereafter, paying attention to the difference in profile between the ferromagnetic powder and the non-magnetic powder in the lower non-magnetic layer, the interface was visually judged and marked with black. The surface of the magnetic layer was similarly marked with black. Thereafter, the length of the line thus marked was measured using an image processor IBAS2 (produced by Zeiss Inc.). In the case where the length of the sample photograph was 21 cm, measurement was conducted 85 to 300 times. The measurements were averaged to obtain δ.

The results are set forth in Tables 3 and 4. The unit of HK×V(TEM) was "kA/m·nm$^3$" and the unit of Vac was "nm$^3$".

TABLE 3

| No. | No. of magnetic powder used | Hc (kA/m) | SQ | Thickness δ (μm) of magnetic field | Br · δ (mT · μm) | Hk (kA/m) | Hr (pulse) kA/m | Hr (VSM) kA/m | Hro kA/m | Vac | ΔHr/Hr (VSM) | Hk × V(TEM) × $10^6$ | Surface roughness (nm) | Output (dB) | C/N (dB) |
|---|---|---|---|---|---|---|---|---|---|---|---|---|---|---|---|
| Example 1 | Production process 1 | 205.5 | 0.615 | 0.13 | 12.9 | 603.4 | 315.7 | 252.9 | 488.9 | 4210 | 0.91 | 1.33 | 2.4 | 3.8 | 6.5 |
| Example 2 | Production process 2 | 201.1 | 0.633 | 0.12 | 13.3 | 579.5 | 272.8 | 240.0 | 453.4 | 4490 | 0.88 | 1.30 | 2.2 | 3.6 | 6.2 |
| Example 3 | Production process 4 | 179.8 | 0.635 | 0.13 | 12.2 | 434.4 | 253.7 | 205.7 | 369.0 | 5540 | 0.72 | 2.15 | 2.4 | 3.1 | 5.2 |
| Example 4 | Production process 5 | 161.2 | 0.628 | 0.12 | 14.3 | 390.1 | 218.4 | 175.3 | 332.4 | 5305 | 0.83 | 1.88 | 2.6 | 3.0 | 5.0 |

TABLE 3-continued

| No. | No. of magnetic powder used | Hc (kA/m) | SQ | Thickness δ (μm) of magnetic field | Br · δ (mT · μm) | Hk (kA/m) | Hr (pulse) kA/m | Hr (VSM) kA/m | Hro kA/m | Vac | ΔHr/Hr (VSM) | Hk × V(TEM) × 10⁶ | Surface roughness (nm) | Output (dB) | C/N (dB) |
|---|---|---|---|---|---|---|---|---|---|---|---|---|---|---|---|
| Example 5 | Production process 6 | 193.7 | 0.625 | 0.13 | 14.4 | 484.3 | 237.7 | 209.2 | 323.2 | 6800 | 0.64 | 1.60 | 2.4 | 3.9 | 5.7 |
| Example 6 | Production process 8 | 156.2 | 0.626 | 0.12 | 13.3 | 411.0 | 219.4 | 184.3 | 324.7 | 5605 | 0.74 | 1.26 | 2.3 | 2.9 | 5.5 |
| Example 7 | Production process 9 | 180.3 | 0.629 | 0.13 | 13.5 | 462.3 | 238.5 | 201.9 | 348.3 | 5505 | 0.79 | 2.11 | 2.4 | 3.3 | 5.4 |
| Comparative Example 1 | Production process 7 | 128.8 | 0.567 | 0.12 | 12.7 | 429.3 | 212.9 | 159.7 | 372.5 | 4185 | 1.14 | 0.75 | 3.0 | −3.5 | −1.8 |
| Comparative Example 2 | Production process 10 | 190.6 | 0.627 | 0.13 | 14.2 | 544.6 | 222.3 | 200.1 | 288.9 | 10000 | 0.51 | 4.47 | 3.5 | 0.0 | 0.0 |
| Comparative Example 3 | Production process 3 | 154.7 | 0.621 | 0.12 | 13.4 | 456.4 | 246.4 | 190.0 | 402.1 | 4500 | 1.05 | 1.02 | 2.4 | 1.5 | 3.3 |

TABLE 4

| No. | No. of magnetic powder used | Hc (kA/m) | SQ | Thickness δ (μm) of magnetic field | Br · δ (mT · μm) | Hk (kA/m) | Hr (pulse) kA/m | Hr (VSM) kA/m | Hro kA/m | Vac | ΔHr/Hr (VSM) | Hk × V(TEM) × 10⁶ | Surface roughness (nm) | Output (dB) | Error rate |
|---|---|---|---|---|---|---|---|---|---|---|---|---|---|---|---|
| Example 8 | Production process 8 | 150.4 | 0.53 | 0.20 | 22.2 | 405.0 | 213.5 | 180.6 | 312.2 | 5855 | 0.75 | 1.24 | 2.0 | 3.4 | 0.002 |
| Example 9 | Production process 9 | 171.5 | 0.53 | 0.20 | 22.3 | 460.3 | 234.7 | 200.2 | 338.2 | 5790 | 0.68 | 2.11 | 2.2 | 4.1 | 0.001 |
| Comparative Example 4 | Production process 10 | 181.8 | 0.53 | 0.20 | 22.5 | 544.2 | 221.6 | 198.6 | 290.6 | 9510 | 0.80 | 4.47 | 3.4 | 0.0 | 1.0 |

The relationship between Hr(t) calculated on Examples 2, 4, 5 and 6 and time is shown in the FIGURE. Comparative Example 3 shows Hr(t) rising in a short range, demonstrating that the effective magnetization inversion magnetic field is growing.

As compared with the related art magnetic recording medium, the magnetic recording medium of the invention exhibits a high C/N ratio and a small Hr(t) and thus can be expected to provide allows a high density recording and cause little signal attenuation even after prolonged storage.

The present application claims foreign priority based on Japanese Patent Application No. JP2003-361638 filed Oct. 22 of 2003, the contents of which is incorporated herein by reference.

What is claimed is:

1. A magnetic recording medium, which comprises:
   a support;
   a non-magnetic layer comprising a binder and a non-magnetic powder; and
   a magnetic layer comprising a binder and a ferromagnetic powder,
   wherein the ferromagnetic powder comprises a hexagonal ferrite magnetic powder having an average diameter of from 10 to 35 nm and a coercive force of from 135 to 400 kA/m;
   the magnetic layer has a coercive force of from 135 to 440 kA/m; and
   a product of an anisotropic magnetic field of the magnetic layer and an average particle volume of the hexagonal ferrite magnetic powder is from $1.2 \times 10^6$ to $2.4 \times 10^6$ kA/m·nm³.

2. The magnetic recording medium according to claim 1, wherein the average particle volume of the hexagonal ferrite magnetic powder is from 2,000 to 5,000 nm³.

3. The magnetic recording medium according to claim 1, wherein the anisotropic magnetic field is from 239 to 1,200 kA/m.

4. The magnetic recording medium according to claim 1, wherein the magnetic layer has a thickness of 0.01 to 0.5 µm.

5. The magnetic recording medium according to claim 1, wherein the magnetic layer satisfies a condition that a product of a residual magnetic flux density and a thickness is from 5 to 100 mT·µm.

6. The magnetic recording medium according to claim 1, wherein the hexagonal ferrite magnetic powder comprises at least one of a barium ferrite, a strontium ferrite, a lead ferrite and a calcium ferrite.

7. The magnetic recording medium according to claim 1, wherein the ferromagnetic powder has an average thickness of from 2 to 15 nm.

8. The magnetic recording medium according to claim 1, wherein the hexagonal ferrite magnetic powder has an average aspect ratio of from 1.5 to 4.

* * * * *